(12) United States Patent
Georghe

(10) Patent No.: US 10,860,908 B1
(45) Date of Patent: Dec. 8, 2020

(54) TEMPLATE EMBEDDED SYMBOL IN GARMENT ASSEMBLY

(71) Applicant: Resonance Companies LLC, New York, NY (US)

(72) Inventor: Christian Georghe, New York, NY (US)

(73) Assignee: RESONANCE COMPANIES LLC, New York, NY (US)

( * ) Notice: Subject to any disclaimer, the term of this patent is extended or adjusted under 35 U.S.C. 154(b) by 0 days.

(21) Appl. No.: 16/702,523

(22) Filed: Dec. 3, 2019

(51) Int. Cl.
*G06K 19/06* (2006.01)
*G06Q 30/00* (2012.01)

(52) U.S. Cl.
CPC . *G06K 19/06046* (2013.01); *G06K 19/06028* (2013.01); *G06K 19/06037* (2013.01); *G06Q 30/0185* (2013.01)

(58) Field of Classification Search
CPC ....... G06K 19/06046; G06K 19/06028; G06K 19/06037
USPC .................................................. 235/375, 385
See application file for complete search history.

(56) References Cited

U.S. PATENT DOCUMENTS

| 6,585,163 | B1* | 7/2003 | Meunier | G06K 19/06028 235/385 |
| 2011/0156869 | A1* | 6/2011 | Watt | G06K 7/0004 340/10.1 |
| 2016/0159106 | A1* | 6/2016 | de Castro | G06Q 30/0241 347/217 |
| 2018/0060937 | A1* | 3/2018 | Shu | D06F 33/00 |
| 2018/0247255 | A1* | 8/2018 | Jones | G06K 9/00771 |
| 2019/0026810 | A1* | 1/2019 | Barnes | G06Q 10/083 |

* cited by examiner

*Primary Examiner* — Allyson N Trail
(74) *Attorney, Agent, or Firm* — Steven M. Greenberg, Esq.; Shutts & Bowen LLP

(57) ABSTRACT

Embodiments of the present provide a method, system and computer program product for garment labeling by way of digitally engineered pattern garment assembly. In particular, a garment labeling method includes loading into memory a digitally engineered specification of patterns forming a garment and retrieving from memory, at least one data record pertaining to the garment. For example, the data may be a serial number of the garment so as to indicate an authenticity of the garment. Thereafter the data is transformed from the at least one data record into a symbol such as a bar code and more specifically a two-dimensional bar code such as a quick response (QR) code. Then, the symbol may be embedded onto one of the patterns of the template and the digitally engineered specification may printed with the symbol onto fabric selected as a basis for the garment so as to form the unassembled set of patterns forming the garment.

14 Claims, 2 Drawing Sheets

TEMPLATE EMBEDDED SYMBOL IN GARMENT ASSEMBLY

BACKGROUND OF THE INVENTION

Field of the Invention

The present invention relates to computer aided fabrication of garments and more particularly to garment labeling during garment assembly.

Description of the Related Art

In sewing and fashion design, a pattern is the template with which the parts of a garment are produced by placing the template upon fabric, tracing the perimeter of the template onto the fabric, cutting the traced portions of the fabric and assembling the cut portions of fabric into a garment. Patterns typically are formed from paper, and sometimes more rigid materials such as paperboard or cardboard so as to support repeated use. The process of making or cutting patterns is known as "patternmaking" and traditionally performed by a patternmaker who typically employs one of two methods to create a pattern. The first method is known as the flat-pattern method in which the entire pattern is drafted on a flat surface from measurements, using rulers, curves and straight-edges. The second method is known as drawing which involves creating a muslin mock-up pattern by pinning fabric directly on a form, and subsequently transferring the muslin outline and markings onto a paper pattern or using the muslin as the pattern itself.

The advent of computing has revolutionized patternmaking. Today, different computer applications facilitate the job of creating patterns by allowing the pattern maker to provide as data input to the application different measurements from which a pattern is generated computationally within a data processing system. Most applications additionally allow the pattern maker to fit individual measurements specifically, eliminating much fitting trial and error previously common in the sewing room. Indeed, the computational power of computing greatly eases the way in which garments are designed so as to more readily support not only mass-produced articles of clothing, but also custom, individually tailored garments known as "bespoke" articles.

Pattern utilization obviously lends itself well to the mass production of garments such that a discrete number of patterns are able to support the production of a wide range of different sizes of the same article of clothing. But, pattern utilization also works well in made-to-measure and bespoke garment fabrication. For made-to-measure garment fabrication, the pre-existing pattern is used to cut the relevant fabric which is then adjusted for the specific size of the customer, whereas in bespoke garment fabrication, a completely new pattern is created according to the measurements of the customer. In the latter circumstance, creating the pattern can be a manually intensive and thus time-consuming process.

To assist in the process of pattern making for bespoke manufacturing, three-dimensional imaging now integrates with computer automated pattern generation. Specifically, it is known today to acquire the measurements of an individual through the use of three-dimensional body scanning. Typically, three-dimensional body scanning is performed utilizing laser imaging in order to produce a computer representation of a scanned human form. Utilizing the scanned human form, a garment surface is defined in relationship to the dimensions of the human form reflected within the computer representation. Once the garment surface has been defined, it is a matter of computational mapping to generate a two-dimensional pattern for printing onto a paper medium using a conventional large format printer.

Of note, advancements in the manufacture of garments and in particular, garment assembly owing to automated template generation, has facilitated the ability of even the smallest operations to produce garments in volume. These same advancements have enabled the substantial duplication of garments illicitly—namely the production of counterfeit garments. Of course, the use of labeling is intended as a source identifier to indicate to the purchaser the authenticity of a garment so as to avoid the ready dissemination of counterfeit garments, but modern technologies have provided the ability to duplicate the labels themselves so as to exacerbate an already challenging circumstance in respect to garment counterfeiting.

BRIEF SUMMARY OF THE INVENTION

Embodiments of the present invention address deficiencies of the art in respect to templated pattern garment assembly and provide a novel and non-obvious method, system and computer program product for garment labeling by way of templated pattern garment assembly. In an embodiment of the invention, a garment labeling method includes loading into memory a digitally engineered specification of a set of patterns forming an unassembled garment and retrieving from memory, at least one data record pertaining to the garment. For example, the data may be a serial number of the garment so as to indicate an authenticity of the garment. Thereafter the data is transformed from the at least one data record into a symbol such as a bar code and more specifically a two-dimensional bar code such as a quick response (QR) code. Then, the symbol may be embedded onto one of the patterns of the digitally engineered specification and the digitally engineered specification may printed with the symbol onto fabric selected as a basis for the garment so as to form the unassembled set of patterns forming the garment.

In another embodiment of the invention, a garment labeling data processing system includes a host computing system that includes at least one computer with memory and at least one processor. The system further includes a large format pattern printer that is coupled to the host computing system. Finally, the system includes a templated pattern generation module. The module includes computer program instructions enabled upon execution in the memory of the host computing system to load into the memory a digitally engineered specification of a set of patterns forming an unassembled garment and to retrieve from the memory, at least one data record pertaining to the garment. The program instructions further are enabled to transform the data from the at least one data record into a symbol and to embed the symbol onto one of the patterns of the digitally engineered specification. Finally, the program code is enabled to direct the large format printer to print the digitally engineered specification with the symbol onto fabric selected as a basis for the garment so as to form the unassembled set of patterns forming the garment.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for garment labeling in templated pattern garment assembly. In accordance with an embodiment of the invention, a digitally engineered specification of a set of patterns for a garment may be retrieved from data storage into memory for printing into the set of patterns from which a garment may be assembled. Responsive to the loading of the digitally engineered specification of the patterns, data for the garment can be retrieved, for instance a serial number or stock keeping unit (SKU) number or both. The data then can be encoded into a bar code such as a QR code. Finally, a portion of the digitally engineered specification of the patterns can be selected and the QR code inserted into the selected portion before the digitally engineered specification of the patterns is then printed on a large format printer along with the QR code. In this way, the pedigree of the garment denoting its authenticity can be embedded on the fabric itself at the time of assembly of the garment.

Figure 1:
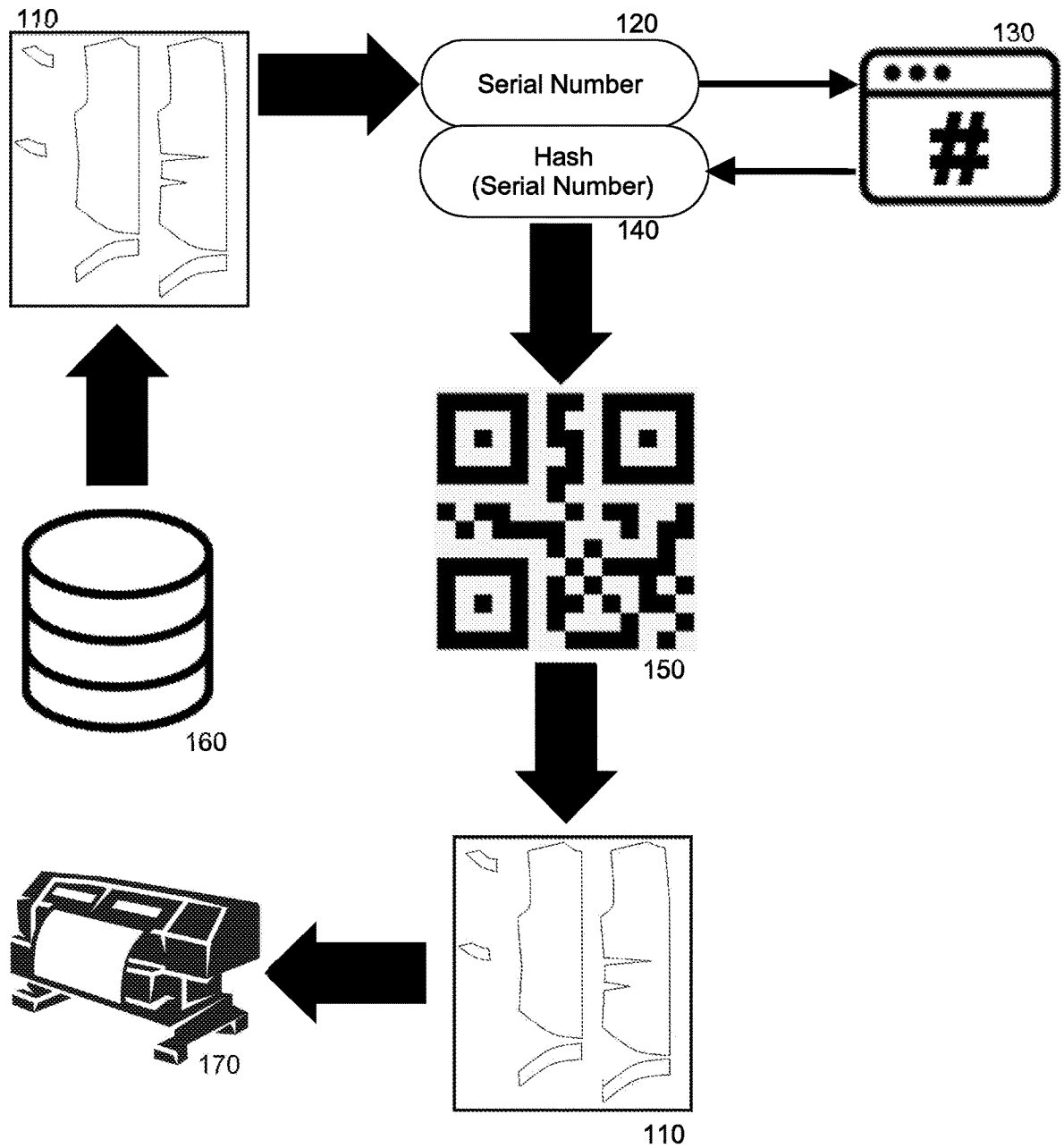
FIG. 1 is pictorial illustration of a process for garment labeling in templated pattern garment assembly.

In further illustration, FIG. 1 is pictorial illustration of a process for garment labeling in templated pattern garment assembly. As shown in FIG. 1, a digitally engineered specification of patterns 110 for a garment can be loaded from fixed storage 160. A serial number 120 is then retrieved for the garment and a hash of the serial number 140 computed according to a hash function 130. The combination of the serial number 120 and the hash of the serial number 140 is then encoded into a QR code 150. Thereafter, a location in the digitally engineered specification of patterns 110 is selected and the QR code 150 is inserted into the digitally engineered specification of patterns 110 at the location. Finally, the template of patterns 110 with inserted QR code 150 is printed using a large format printer 170 for use in assembling the garment.

Figure 2:
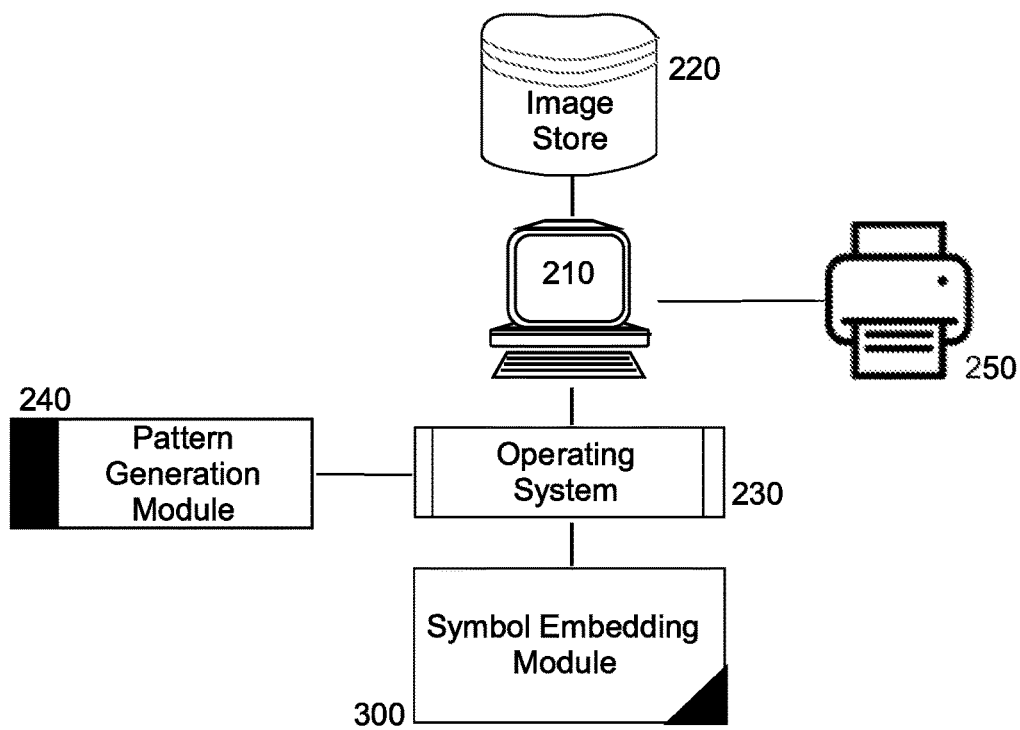
FIG. 2 is a schematic illustration of a templated pattern garment assembly data processing system configured for garment labeling; and, FIG. 3 is a flow chart illustrating a process for garment labeling in templated pattern garment assembly.

The process described in connection with FIG. 1 may be implemented in a pattern garment assembly data processing system. In further illustration, FIG. 2 schematically shows a templated pattern garment assembly data processing system configured for garment labeling. The system includes a host computing platform 210 that includes one or more computers, each with memory and at least one processor. An operating system 230 executes in the memory of the host computing platform 210 and supports the operation of a pattern generation module 240. The pattern generation module 240 is enabled during execution in the memory of the host computing platform 210 to retrieve from image store 220 different patterns and generate a digitally engineered specification for one of the patterns for printing onto large format printer 250.

Of note, the system also includes a symbol embedding module 300. The symbol embedding module 300 includes computer program instructions that, upon execution in the memory of the host computing platform 210, are enabled to identify a garment for which a digitally engineered specification of patterns has been loaded for printing. Then, data for the garment is retrieved from data storage. For example, a serial number or a SKU for the garment is retrieved and encoded in a bar code such as a two-dimensional bar code like a QR code. The program instructions then select a location in the digitally engineered specification of patterns and add the QR code to the digitally engineered specification of patterns. Finally, the program instructions direct the printing of the digitally engineered specification of the patterns in a large format printer.

Figure 3:
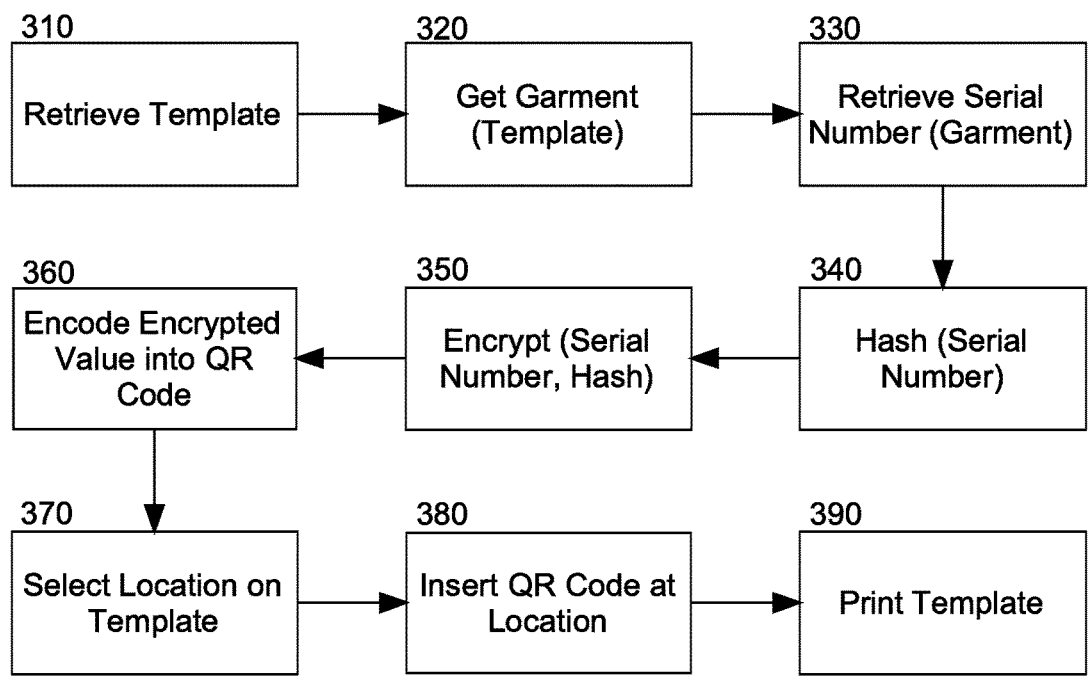

In even yet further illustration of the operation of the symbol embedding module, FIG. 3 is a flow chart illustrating a process for garment labeling in templated pattern garment assembly. Beginning in block 310, a digitally engineered specification of a set of patterns for a garment is retrieved for processing and in block 320, the garment associated with the digitally engineered specification of the patterns is determined. In block 330, a serial number is retrieved for the garment and in block 340, a hash is computed for the serial number. In block 350, the serial number and the hash are encrypted and in block 360 the encrypted serial number and hash are encoded into a QR code. Then, in block 370 a location is selected within the digitally engineered specification of the patterns and in block 380 the QR code is inserted into the location. Finally, in block 390 the digitally engineered specification of the patterns is printed.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

1. A digitally engineered garment labeling method comprising:
    loading into memory a digitally engineered specification of an unassembled set of patterns which when assembled form a garment;
    retrieving from the memory, at least one data record pertaining to the garment comprising a serial number of the garment;
    combining a hash of the serial number with the serial number and encrypting the combination;
    transforming the encrypted combination into a symbol;
    selecting a location in the digitally engineered specification of patterns;
    embedding the symbol onto one of the patterns of the digitally engineered specification; and,
    printing the digitally engineered specification of the unassembled set of patterns with the symbol onto fabric selected as a basis for the garment so as to form the unassembled set of patterns forming the garment.

2. The method of claim 1, wherein the symbol is a bar code.

3. The method of claim 2, wherein the bar code is a two-dimensional bar code.

4. The method of claim 3, wherein the two-dimensional bar code is a quick response (QR) code.

5. A garment labeling data processing system configured for digital engineering of a garment, the system comprising:
    a host computing system comprising at least one computer with memory and at least one processor;
    a large format pattern printer coupled to the host computing system; and,
    a templated pattern generation module comprising computer program instructions enabled upon execution in the memory of the host computing system to perform:
    loading into the memory a digitally engineered specification of an unassembled set of patterns forming a garment;
    retrieving from the memory, at least one data record pertaining to the garment comprising a serial number of the garment;
    combining a hash of the serial number with the serial number and encrypting the combination;
    transforming the encrypted combination into a symbol;
    selecting a location in the digitally engineered specification of patterns;
    embedding the symbol onto one of the patterns of the digitally engineered specification; and,
    directing the large format printer to print the digitally engineered specification with the symbol onto fabric selected as a basis for the garment so as to form the unassembled set of patterns forming the garment.

6. The system of claim 5, wherein the symbol is a bar code.

7. The system of claim 6, wherein the bar code is a two-dimensional bar code.

8. The system of claim 7, wherein the two-dimensional bar code is a quick response (QR) code.

9. A computer program product for digitally engineered garment labeling, the computer program product including a computer readable storage medium having program instructions embodied therewith, the program instructions executable by a device to cause the device to perform a method including:

loading into memory a digitally engineered specification of an unassembled set of patterns forming a garment;

retrieving from the memory, at least one data record pertaining to the garment comprising a serial number of the garment;

combining a hash of the serial number with the serial number and encrypting the combination;

transforming the encrypted combination into a symbol;

selecting a location in the digitally engineered specification of patterns;

embedding the symbol onto one of the patterns of the digitally engineered specification; and, printing the digitally engineered specification with the symbol onto fabric selected as a basis for the garment so as to form the unassembled set of patterns forming the garment.

10. The computer program product of claim 9, wherein the symbol is a bar code.

11. The computer program product of claim 10, wherein the bar code is a two-dimensional bar code.

12. The computer program product of claim 11, wherein the two-dimensional bar code is a quick response (QR) code.

13. The computer program product of claim 12, wherein that data is a serial number of the garment and a hash value of the serial number.

14. The computer program product of claim 13, wherein the data is an encrypted form of the serial number of the garment and the hash value.

* * * * *